Feb. 21, 1956 N. S. ELLIS ET AL 2,735,962
ELECTRIC PROTECTIVE ARRANGEMENTS
Filed Oct. 15, 1951
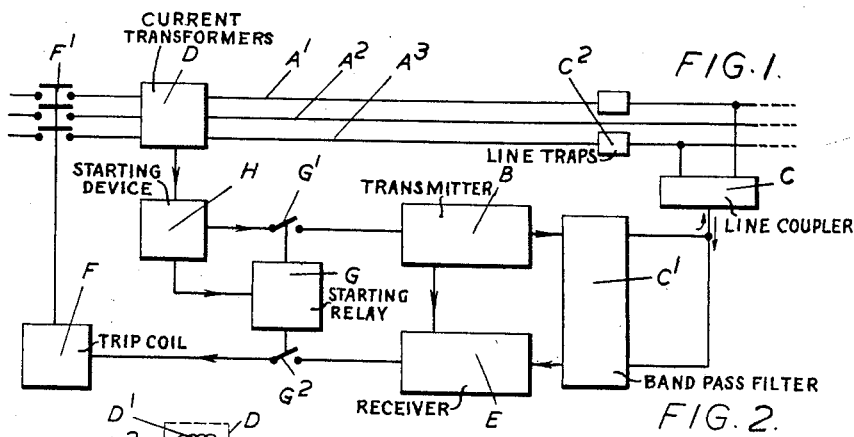
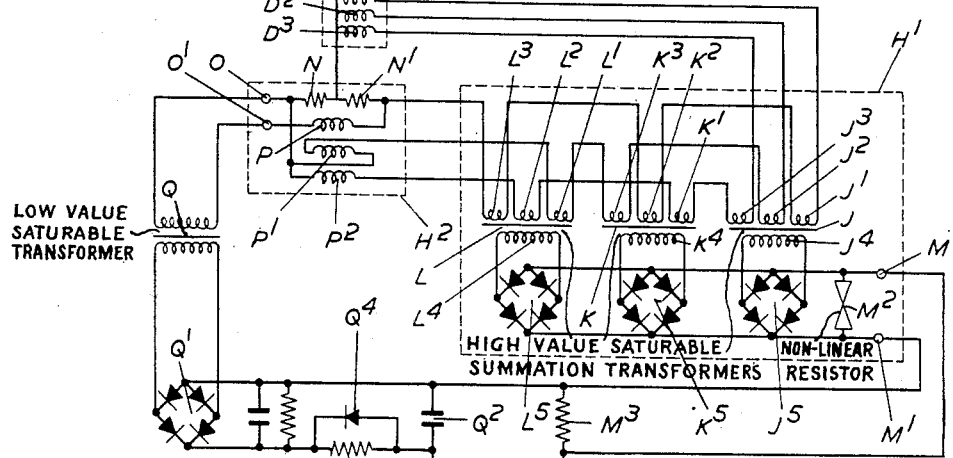
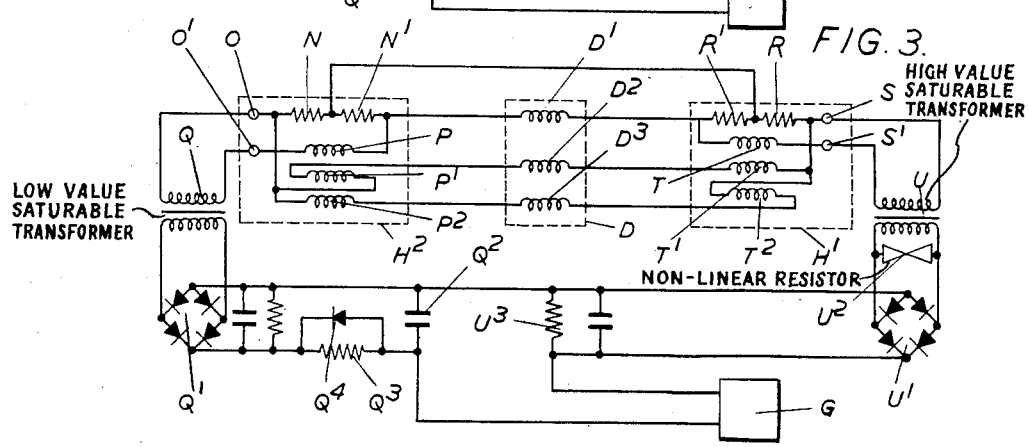
*Inventor*
Norman S. Ellis
and Clement H. Lackey
By
Emery, Holcombe & Blair
*Attorney*

United States Patent Office 2,735,962
Patented Feb. 21, 1956

2,735,962

ELECTRIC PROTECTIVE ARRANGEMENTS

Norman Sadler Ellis, South Shields, and Clemett Harrison Lackey, Newcastle-on-Tyne, England, assignors to A. Reyrolle & Company Limited, Hebburn-on-Tyne, England, a company of Great Britain Application October 15, 1951, Serial No. 251,418

17 Claims. (Cl. 317—29)

This invention relates to an electric protective arrangement for a three-phase electric circuit. In some types of protective arrangement (for example a carrier-current protective arrangement, such for instance as those described in British patent specifications Nos. 598,581 and 610,610) it is convenient to keep the protective equipment normally out of action and to provide a starting device for bringing it into action on the occurrence of a fault. The present invention is concerned with such a fault-responsive starting device.

On the relatively complicated electric supply circuits, which are common nowadays, a difficulty sometimes arises with such starting devices owing to the wide variation of normal load currents. In order to avoid bringing the protective equipment into operation in the event of an increase of normal load current, when no fault has occurred, it has usually been necessary for the setting of the starting device to be greater than the maximum load current, but it can then happen, when for instance the amount of generating plant in commission is small, that a fault can occur which is below the setting of the starting device and does not therefore bring the protective equipment into action.

The present invention has for its object to provide an improved fault-responsive starting device, whose setting will change automatically with changes of normal load current, so that the protective equipment will always be brought into action in the event of a fault, even a three-phase fault of magnitude less than the maximum normal load current, but will not come into action (except possibly in certain circumstances for only a very brief interval) on change of normal load current.

The starting device according to the invention comprises an operating network and a bias network both energised from the secondaries of current transformers in the individual phases of the protected circuit, the two networks being arranged to give approximately equal outputs so long as steady balanced three-phase primary currents of magnitude not greater than the normal maximum load current are flowing in the protected circuit, means for connecting the two network outputs in opposition for controlling a relay or other device, and means for delaying the response of the bias network to sudden changes in the primary currents.

The output of the operating network is preferably arranged to be greater than that of the bias network when unbalanced primary currents are flowing in the protected circuit.

It is also convenient to provide a saturable device in the bias network to limit the output thereof in the case of severe three-phase faults. Alternatively the two networks may be so arranged, that the difference between their outputs for balanced three-phase currents increases with the magnitude of such currents, the difference becoming sufficient for operation of the relay or other device at a value slightly above maximum normal load current.

The two networks preferably incorporate rectifiers for rectifying their outputs.

The delaying means may comprise a condenser connected across the output circuit of the bias network and a resistance so associated therewith as to delay the charging up of the condenser. In order to provide for quick resetting, a rectifier is preferably provided across such resistance to enable the condenser to discharge rapidly without interfering with the relatively slow charging thereof.

Each of the two networks is preferably such that, for a given fault magnitude, the output is approximately the same for all faults of the same type, irrespective of which phase or phases are faulty, that is the output for an earth fault on one phase is the same as that for an earth fault on either of the other two phases of the same magnitude, and similarly a two-phase fault across one pair of phases gives the same network output as a similar two-phase fault across either of the other pairs of phases, the outputs of the two networks for the same type of fault not necessarily being the same as each other.

The operating network may comprise three summation transformers each having three primary windings respectively energised from the three current transformer secondaries and three rectifiers or sets of rectifiers respectively connected to the secondary windings of the three summation transformers and having their output circuits additively connected in the output circuit of the network. In such network, the effective transformation ratios for the three primary windings are preferably different from one another, the same three ratios being present in the three transformers but in different orders, the primary windings being cyclically arranged with respect to the three phases. The operating network may, however, be otherwise arranged, and may comprise, for instance, a phase sequence network having an output dependent upon the positive and negative phase sequence components of the current transformer secondary current.

The bias network may also take various forms but preferably comprises a phase sequence network having an output dependent on the positive phase sequence component of the current transformer secondary current.

The invention may be carried into practice in various ways, but the accompanying drawings illustrate by way of example two alternative practical arrangements of fault-responsive starting device according thereto, intended primarily for use in a protective arrangement of the kind described in British patent specification No. 610,610 above mentioned. In these drawings:

Figure 1 is a block diagram indicating the general arrangement of the protective apparatus at one end of the protected section, incorporating the fault-responsive starting device of the present invention, and Figures 2 and 3 are circuit diagrams respectively showing the two alternative forms of fault-responsive starting device.

In the protective arrangement indicated in Figure 1, the apparatus at the two ends of the protected section of the three-phase main circuit $A^1$, $A^2$, $A^3$ are similar to one another, the figure showing the apparatus at one end only. A transmitter B is provided at each end for transmitting over the main circuit $A^1$, $A^2$, $A^3$ through a suitable line coupling device C to the remote end of the protected section a high frequency carrier current signal modulated in accordance with the secondary output of current transformers generally indicated at D on the main circuit. A receiver E is also provided at each end for receiving such modulated carrier current signal from the remote end. The transmission frequencies at the two ends are different from one another, and band-pass filter circuits indicated at $C^1$ are provided between the transmitter and receiver B, E and the line coupling device C so tuned as to ensure that the receiver will receive the carrier current signal from the remote end but not that from the adjacent end. Line traps C² are provided to confine the high frequency currents to the protected section. The receiver incorporates a mixer circuit, which acts to compare the demodulated output derived from the signal from the remote end with the adjacent current transformer secondary output, suitably fed to it, and controls a tripping device indicated at F in accordance with the phase relationship between the two outputs, the arrangement being such that the tripping device F will operate to trip a circuit-breaker F¹ in the main circuit to cut out the protected section, in the event of an internal fault within the protected section but not in the event of a fault on the main circuit external to the protected section.

The protective equipment is normally out of action, but is brought into operation on the occurrence of a fault on the main circuit under the control at each end of a two-stage starting relay device indicated at G. The two stages of this device operate at different fault settings, the first stage, operating at the lower fault setting, controlling contacts G¹ for rendering the transmitter operative to transmit its signal to the remote end, whilst the second stage, operating at the higher fault setting, acts at contacts G² to prepare the tripping device F for operation.

The details of the protective apparatus so far described do not form part of the present invention, which is concerned with a fault-responsive starting device H for controlling the operation of the two-stage starting relay device. Two alternative arrangements of such fault-responsive starting device according to the invention are shown respectively in Figures 2 and 3 and will now be described, taking first that shown in Figure 2.

This starting device H consists essentially of an operating network H¹ and a bias network H², the two networks being energised in series from the secondaries of three current transformers D¹, D², D³ respectively on the three phases A¹, A², A³ of the protected circuit, such secondaries being connected in star on one side.

The operating network H¹ may take various forms but in the arrangement of Figure 2 comprises three summation transformers J, K, L, each having three primary windings J¹, J², J³ (or K¹, K², K³ or L¹, L², L³) and a single secondary winding J⁴ (or K⁴ or L⁴) mounted on a saturable core. The three primary windings on each transformer have different numbers of turns, the effective transformation ratios being, for example, 0.42:1, 1:1 and 1.58:1. The same ratios are used in all three transformers, but in different orders, the primary windings of the three transformers being connected to the current transformer secondaries in the three phases in cyclical order, so that in each phase there will be three primary windings J¹, K², L³ or J², K³, L¹ or J³, K¹, L² in series with one another, one on each transformer and one for each of the three ratios.

Each summation transformer secondary winding J⁴ (or K⁴ or L⁴) is connected to the input terminals of a bridge rectifier J⁵ (or K⁵ or L⁵) giving full-wave rectification, the output terminals of the three rectifiers J⁵, K⁵, L⁵ being connected together and to the output terminals M, M¹ of the network, so that the output of the network will be the sum of the rectified outputs from the three summation transformers J, K, L. In order to limit the peak value of the rectified output voltage, a non-linear resistance M² of one of the well-known types is connected in shunt across the output circuit of the network.

It will be clear that, with this arrangement, the network output for a given fault magnitude will be the same for all earth faults, irrespective of the phase on which the fault has occurred. Thus, with the particular numerical example given above, the network output for an earth-fault of unit magnitude will be 0.42+1+1.58=3.0.

Similarly, the network output will be the same for all two-phase faults of the same magnitude. Thus, in the example, for a two-phase fault of unit magnitude, the secondary outputs of the three summation transformers will be (0.42–1), (1.58–0.42) and (1–1.58), and the numerical sum of these outputs (signs being ignored owing to the rectification) will be 2.32.

It can be shown that the corresponding numerical value of the network output for a three-phase fault is 3.0.

This example has the advantage that the network output is more or less the same for all types of fault. In practice, it is convenient to make the effective transformation ratios of the individual windings of the summation transformers J, K, L adjustable to suit particular requirements, but in general the resultant output for a two-phase fault should be not less than 0.67 and not more than 0.77 times that for a three-phase fault of the same magnitude, and the resultant output for an earth fault should be greater than half the corresponding output for a three-phase fault of the same magnitude.

The bias network H² (the A. C. output from which may conveniently be used also for modulating the carrier current signal generated by the transmitter B of Figure 1) may be arranged in various ways, but preferably consists of a phase-sequence network responsive to the positive phase-sequence component of the current transformer secondary current. In one arrangement, the network comprises two resistances N, N¹ connected between the primary windings of the operating network in one phase and the first A. C. output terminal O of the bias network, the junction point between the two resistances being connected to the starpoint of the current transformer secondaries D¹, D², D³, and a three-winding reactor, one winding P of which is connected between the primary windings of the operating network in the same phase and the second A. C. output terminal O¹. The other two windings P¹, P² of the reactor are respectively connected in opposite senses between the first A. C. output terminal O of the bias network and the primary windings of the operating network in the other two phases. The resistance and reactance values are so chosen that the bias network will respond to the positive phase-sequence component of the current transformer secondary current but not to the negative and zero phase-sequence components thereof. The bias network output is the same for all earth faults, for a given fault magnitude, and similarly for two-phase faults. The A. C. output terminals O, O¹ of the bias network are connected through a saturable transformer Q to the input terminals of a full-wave rectifier Q¹, and the constants of the bias network H² are so chosen that the rectified output is the same as that of the operating network H¹ for normal balanced load current and for small three-phase faults but is less than that of the operating network for earth-faults and for two-phase faults and also for severe three-phase faults sufficient to cause saturation of the saturable transformer Q and thereby to limit the bias network output.

The rectified outputs of the two networks are connected together in opposition in the energising circuit of the starting relay device G of the protective equipment, the output from the operating network H¹ being applied across a resistance M³ whilst that from the bias network H² is applied across a condenser Q², a resistance Q³ being connected in series with the output circuit to introduce a time factor in the charging up of the condenser.

With balanced normal load current, there is no resultant output for energising the starting relay device G, since the two network outputs are equal. With a sudden increase in current transformer secondary output, the operating network H¹ will respond immediately, but it will take some time for the output voltage of the bias network H² to build up across the condenser Q², and the starting relay device G will therefore be brought into operation. If the sudden increase was due to an earth fault or a two-phase fault, the starting relay device G will remain in operation until the fault is cleared, since even when the voltage has built up across the condenser $Q^2$ it will still be less than that from the operating network $H^1$. The same applies also to severe three-phase faults for which the output of the bias network $H^2$, after the condenser $Q^2$ has charged up, will be less than that of the operating network $H^1$ owing to the saturation of the transformer Q in the bias network output circuit. This transformer Q is arranged to saturate at a value somewhat higher than that due to maximum balanced normal load current.

If, however, the sudden increase was due to a three-phase fault of value less than or only slightly larger than maximum normal load current, the two network outputs will again be equal after the condenser $Q^2$ has charged up. In such case, the starting relay device G will be brought into operation, but will go out of action again after a few seconds when the condenser $Q^2$ has charged up. This time delay is chosen to be sufficient to ensure proper operation of the protective equipment before the starting relay device G goes out of action.

In the event of an increase in balanced normal load current not due to a fault, the increase will usually take place relatively gradually and the condenser $Q^2$ will therefore be able to charge up sufficiently to maintain the starting relay device G out of action. It is possible that, in such event, the charging up of the condenser might not be quite quick enough to prevent the starting relay device from operating, but such undesired operation is likely to occur only rarely and in any event will not cause tripping and its duration will be so short as to cause negligible interference with other services, the inconvenience caused being so slight as to be far outweighed by the advantage of satisfactory operation on small three-phase faults.

It has been mentioned that the summation transformers J, K, L in the operating network $H^1$ are saturable and that a non-linear resistance $M^2$ is connected across the output circuit of such network to limit the peak value of the output voltage. These provisions are made in order to keep the size of the components of the network to a minimum and to limit the burden on the current transformers $D^1$, $D^2$, $D^3$, but it should be made clear that this saturation limit is made higher than that of the output of the bias network, in order not to interfere with the operation of the device as above described.

It is desirable that the relatively slow rate of charging of the condenser $Q^2$ in the output circuit of the bias network $H^2$ should not apply also to the discharging of the condenser, in order to provide for quick resetting of the device after a fault has been cleared, and thereby to ensure that in the event of successive faults the device will always start from its normal condition. This can readily be achieved by the provision of a half-wave rectifier $Q^4$ across the resistance $Q^3$ controlling the time factor of the condenser, so that the condenser can discharge substantially instantaneously without interfering with the slow rate of charging thereof.

The alternative arrangement shown in Figure 3 differs from that of Figure 2 solely in the arrangement of the operating network $H^1$, which in this case is in the form of a phase-sequence network responsive to the positive and negative phase-sequence components of the current-transformer secondary output. This network comprises two resistances R, $R^1$ connected between one phase $D^1$ of the current transformer secondaries and the first A. C. output terminal S of the network, the junction point between the two resistances being connected to the corresponding point of the bias network $H^2$ by a lead, which in this example acts as a star point for the current transformer secondaries, and a three-winding reactor whose first winding T is connected between the same current transformer secondary $D^1$ and the second A. C. output terminal $S^1$. The other two windings $T^1$, $T^2$ of the reactor are connected in opposite senses respectively between the other two phases $D^2$, $D^3$ of the current transformer secondaries and the first A. C. output terminal S, the values of the resistances and of the reactances being so chosen as to make the network responsive to the positive and negative phase-sequence components but not to the zero phase-sequence component of the current transformer secondary output. The A. C. output terminals S, $S^1$ are connected through a saturable transformer U to the input terminals of a full wave rectifier $U^1$, a non-linear resistor $U^2$ (analogous to the non-linear resistor $M^2$ of Figure 2) being connected across the circuit. The rectified output from the rectifier $U^1$ is applied across a resistance $U^3$ (analogous to the resistance $M^3$ of Figure 2) in opposition to the rectified output from the bias network in the energising circuit of the starting relay device G. The rectified output from the operating network $H^2$ in this arrangement for the various types of fault is generally the same as that in the arrangement of Figure 2.

In both arrangements, it has been mentioned that the opposed outputs from the two networks are approximately the same in normal conditions. In practice, whilst this still remains true, it is found desirable to make the bias network output very slightly greater than the operating network output over the whole normal load-current rays.

It will be appreciated that the foregoing arrangements have been described by way of example only and may be modified in various ways within the scope of the invention.

What we claim as our invention and desire to secure by Letters Patent is:

1. A fault-responsive starting device for controlling a relay or other device in a protective arrangement for a three-phase electric circuit having current transformers in its individual phases, comprising a three-phase operating phase sequence segregating network, a three-phase bias phase sequence segregating network, means connecting the two networks to the secondaries of the respective current transformers, means in each of said networks having resistance and reactance values connected to said respective current transformer secondaries whereby the two networks are caused to give equal outputs so long as balanced three-phase primary currents of magnitude not greater than the normal maximum load current are flowing in the protected circuit, circuit means connecting the two network out-puts in opposition for controlling the relay or other device, and a delay device connected across the output circuit of said bias network for delaying the response of the bias network to sudden changes in the primary currents.

2. A fault-responsive starting device for controlling a relay or other device in a protective arrangement for a three-phase electric circuit having current transformers in its individual phases, comprising a three-phase operating phase sequence segregating network energized from the current transformers and giving an output dependent upon the phase sequence components of the current transformer secondary current, a three-phase bias phase sequence segregating network energized from the current transformers and giving an output which is dependent upon the phase sequence components of the current transformer secondary current and has a value equal to that of the operating network so long as balanced three-phase primary currents of magnitude not greater than the normal maximum load current are flowing in the protected circuit, means connecting the two network outputs in opposition for controlling the relay or other device, and a delay device connected across the output circuit of the bias network whereby in the event of sudden changes in the primary currents the output of the bias network will change more slowly than that of the operating network.

3. A fault-responsive starting device as claimed in claim 2, in which the electrical constants of the two networks have different values such that the output of the operating network is greater than that of the bias network when unbalanced primary currents are flowing in the protected circuit.

4. A fault-responsive starting device as claimed in claim 3, including a saturable device connected in the output circuit of the bias network for limiting the output thereof.

5. A fault-responsive starting device as claimed in claim 2, in which the delay device comprises a condenser connected across the output circuit of the bias network, and a resistance connected in series with the condenser for delaying the charging up of the condenser.

6. A fault-responsive starting device as claimed in claim 5, including a rectifier connected across the resistance whereby the condenser will discharge rapidly and will charge relatively slowly.

7. A fault-responsive starting device for controlling a relay or other device in a protective arrangement for a three-phase electric circuit having current transformers in its individual phases, comprising a three-phase operating phase sequence segregating network energized from the current transformers and giving an output dependent upon the phase sequence components of the current transformer secondary current, a three-phase bias phase sequence segregating network energized from the current transformers and giving an output which is dependent upon the phase sequence components of the current transformer secondary current and which has a value equal to that of the operating network so long as balanced three-phase primary currents of magnitude not greater than the normal maximum load current are flowing in the protected circuit, each said network giving an output for a given fault magnitude which is substantially the same for all faults of the same type irrespective of which phase or phases are faulty, rectifiers in the two networks for rectifying the outputs thereof, means connecting the two network outputs in opposition for controlling the relay or other device, and a delay device connected across the output circuit of the bias network whereby in the event of sudden changes in the primary currents the output of the bias network will change more slowly than that of the operating network.

8. A fault-responsive starting device as claimed in claim 7, in which the bias network comprises a phase sequence segregating network having an output dependent upon the positive phase-sequence component of the current transformer secondary current.

9. A fault-responsive starting device as claimed in claim 8, in which the delay device comprises a condenser connected across the output circuit of the bias network, and a resistance connected in series with the condenser for delaying the charging up of the condenser.

10. A fault-responsive starting device as claimed in claim 7, in which the operating network comprises a phase sequence segregating network having an output dependent upon the positive and negative phase-sequence components of the current transformer secondary current.

11. A fault-responsive starting device as claimed in claim 10, in which the bias network comprises a phase sequence segregating network having an output dependent upon the positive phase-sequence component of the current transformer secondary current.

12. A fault-responsive starting device as claimed in claim 11, in which the delay device comprises a condenser connected across the output circuit of the bias network, and a resistance connected in series with the condenser for delaying the charging up of the condenser.

13. A fault-responsive starting device as claimed in claim 7, in which the delay device comprises a condenser connected across the output circuit of the bias network, and a resistance connected in series with the condenser for delaying the charging up of the condenser.

14. A fault-responsive starting device for controlling a relay or other device in a protective arrangement for a three-phase electric circuit having current transformers in its individual phases, comprising a three-phase operating network including three summation transformers each having three primary windings respectively energized from the three current transformers and each giving an output which is dependent upon the phase sequence components of the transformers secondary current, and three rectifiers respectively connected to the secondary windings of the three summation transformers and having their output circuits additively connected in the output circuit of the operating network, in combination with a three-phase bias phase sequence segregating network energized from the three current transformers and giving an output which is dependent upon the phase sequence components of the current transformer secondary current and which has a value equal to that of the operating network so long as balanced three-phase primary currents of magnitude not greater than the normal maximum load current are flowing in the protected circuit, each said network giving an output for a given fault magnitude which is substantially the same for all faults of the same type irrespective of which phase or phases are faulty, rectifiers in the two networks for rectifying the outputs thereof, means connecting the two network outputs in opposition for controlling the relay or other device, and a delay device connected across the output circuit of the bias network whereby in the event of sudden changes in the primary currents the output of the bias network will change more slowly than that of the operating network.

15. A fault-responsive starting device as claimed in claim 14 in which the effective transformation ratios for the three primary windings are different from one another, the same three ratios being present in the three transformers but in different order and the primary windings being cyclically arranged with respect to the three phases.

16. A fault-responsive starting device as claimed in claim 14, in which the bias network comprises a phase sequence segregating network having an output dependent upon the positive phase-sequence component of the current transformer secondary current.

17. A fault-responsive starting device as claimed in claim 16, in which the delay device comprises a condenser connected across the output circuit of the bias network, and a resistance connected in series with the condenser for delaying the charging up of the condenser.

References Cited in the file of this patent

UNITED STATES PATENTS

| | | |
|---|---|---|
| 1,752,947 | Genkin | Apr. 1, 1930 |
| 1,929,059 | Fitzgerald | Oct. 3, 1933 |
| 1,971,103 | Friedlander et al. | Aug. 21, 1934 |
| 2,315,470 | Warrington | Mar. 30, 1943 |
| 2,354,152 | Sonneman | July 18, 1944 |
| 2,406,584 | Bostwick | Aug. 27, 1946 |

FOREIGN PATENTS

| | | |
|---|---|---|
| 699,300 | Great Britain | Nov. 4, 1953 |